US008699101B2

(12) United States Patent
Mukai

(10) Patent No.: US 8,699,101 B2
(45) Date of Patent: Apr. 15, 2014

(54) IMAGE READERS

(75) Inventor: Takaaki Mukai, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 72 days.

(21) Appl. No.: 13/429,673

(22) Filed: Mar. 26, 2012

(65) Prior Publication Data

US 2013/0057932 A1 Mar. 7, 2013

(30) Foreign Application Priority Data

Sep. 7, 2011 (JP) ................................ 2011-195114

(51) Int. Cl.
*H04N 1/04* (2006.01)

(52) U.S. Cl.
USPC ........... 358/498; 358/474; 358/497; 399/367; 399/373; 271/121; 271/118

(58) Field of Classification Search
USPC ........... 358/474.498, 496, 501; 399/367, 377, 399/373; 271/121, 127, 118, 264, 272, 271/265.01, 258.01
See application file for complete search history.

(56) References Cited

U.S. PATENT DOCUMENTS

| | | | | |
|---|---|---|---|---|
| 5,519,512 | A * | 5/1996 | Bandai et al. | 358/474 |
| 7,212,317 | B2 * | 5/2007 | Ogata | 358/474 |
| 7,722,033 | B2 * | 5/2010 | Matsumoto et al. | 271/162 |
| 7,731,350 | B2 * | 6/2010 | Yamamoto | 347/104 |
| 7,907,312 | B2 * | 3/2011 | Miyahara | 358/497 |
| 8,081,352 | B2 * | 12/2011 | Ogushi et al. | 358/474 |
| 8,115,971 | B2 * | 2/2012 | Osakabe et al. | 358/474 |
| 8,169,669 | B2 * | 5/2012 | Yoshida et al. | 358/471 |
| 8,210,516 | B2 * | 7/2012 | Acton et al. | 271/3.14 |
| 8,330,998 | B2 * | 12/2012 | Yoshida et al. | 358/474 |
| 2002/0067513 | A1 * | 6/2002 | Sasai et al. | 358/400 |
| 2007/0285741 | A1 * | 12/2007 | Sato et al. | 358/497 |
| 2008/0225347 | A1 * | 9/2008 | Hwang et al. | 358/474 |
| 2010/0053701 | A1 | 3/2010 | Yoshida et al. | |
| 2010/0060948 | A1 * | 3/2010 | Yoshida et al. | 358/474 |
| 2012/0044513 | A1 * | 2/2012 | Park et al. | 358/1.12 |
| 2013/0201537 | A1 * | 8/2013 | Fujiwara | 358/498 |
| 2013/0222867 | A1 * | 8/2013 | Tomita | 358/498 |

FOREIGN PATENT DOCUMENTS

| | | |
|---|---|---|
| JP | 04-359270 | 12/1992 |
| JP | 2005-227724 | 8/2005 |
| JP | 2006-276212 | 10/2006 |
| JP | 2010-062839 | 3/2010 |

* cited by examiner

*Primary Examiner* — Negussie Worku
(74) *Attorney, Agent, or Firm* — Banner & Witfcoff, Ltd.

(57) ABSTRACT

An image reader is provided, which includes a feed tray that has a loading surface and is swingable around a first swing axis parallel to a width direction of a document sheet placed on the feed tray between a first position where the loading surface is directed downward above a housing and a second position where the loading surface is directed upward at an upstream side relative to the housing in the feeding direction, a first opening formed between the housing and the feed tray placed in the second position, the first opening being configured such that an inside of the housing communicates with an outside of the housing therethrough, a second opening formed in a position higher than a power supply unit and lower than the first opening inside the housing, and a communication path through which the first opening communicates with the second opening.

11 Claims, 7 Drawing Sheets

UP
FRONT LEFT
RIGHT REAR
DOWN
1
51
200T
50
X1
X2
200
300
400L
101A
100
100L
101
8
400R
100R
8E 50
51
9
D1
55R
50R
X1
200T
200
X2
101A
101
100
100R
8
3
400R
80
7A
8F
61
60
7B
7
7C
300
P1
1
6A
6
UP
REAR
FRONT
DOWN 1
100
101
101B
101A
3E
20
40
80E
40A
88
89
109A
101T
101C
W2
109B
3
60E
S2
30
W1
200
87
40B
70
80A
S1
50E
X1
56L
82
61
80
60
55L
50
51
300
UP
REAR
FRONT
DOWN 100
101B
101
101A
3E
20
80E
50
51
T1
41
200T
200
101T
109A
109B
101C
40A
88
89
10
40
3
87
40B
80A
70
50E
60E
55L
56L
X1
61
82
80
60
1
300
UP
REAR
DOWN
FRONT

IMAGE READERS

CROSS-REFERENCE TO RELATED APPLICATION

This application claims priority under 35 U.S.C. §119 from Japanese Patent Application No. 2011-195114 filed on Sep. 7, 2011. The entire subject matter of the application is incorporated herein by reference.

BACKGROUND

1. Technical Field

The following description relates to one or more image readers.

2. Related Art

An image reader has been known that includes a housing, a feed tray, and a reading unit. The feed tray is formed in a flat plate shape having a loading surface on which there is placed a stack of sheets to be fed into the housing. Further, the feed tray is swingable around a swing axis parallel to the width direction of the sheets to be fed, between a first position where the loading surface is directed downward above the housing and a second position where the loading surface is directed upward at an upstream side relative to the housing in a feeding direction. The reading unit is configured to feed the sheets placed on the loading surface into the housing and read images of the sheets.

SUMMARY

In general, the known image reader does not include a power supply (such as an AC adapter) provided in the housing. Hence, in most cases, for instance, the known image reader is supplied with electricity from an electric outlet via an AC adapter provided outside the housing. When a power supply such as an AC adapter is provided inside the housing to achieve a lower manufacturing cost, it might lead to a high temperature, inside the housing, caused by accumulation of heat exhausted from the power supply. Such a high temperature inside the housing might result in an operational failure of the reading unit.

Aspects of the disclosure are advantageous to provide one or more improved techniques for an image reader that make it possible to prevent an operational failure of a reading unit from being caused by accumulation of heat exhausted from a power supply.

According to aspects of the disclosure, an image reader is provided, which includes a housing, a feed tray that includes a loading surface configured such that a document sheet to be fed into the housing along a feeding direction are placed thereon, the feed tray being formed in a flat plate shape and configured to be swingable around a first swing axis parallel to a width direction of the document sheet between a first position where the loading surface is directed downward above the housing and a second position where the loading surface is directed upward at an upstream side relative to the housing in the feeding direction, a reading unit disposed inside the housing, the reading unit being configured to feed the document sheet placed on the loading surface into the housing and read an image of the document sheet, a power supply unit disposed under the first swing axis inside the housing, the power supply unit being configured to supply electricity to the reading unit, a first opening formed between the housing and the feed tray placed in the second position, the first opening being configured such that an inside of the housing communicates with an outside of the housing therethrough, a second opening formed in a position higher than the power supply unit and lower than the first opening inside the housing, and a communication path configured such that the first opening communicates with the second opening therethrough.

Further, aspects of the disclosure are advantageous to provide one or more improved techniques that enable the image reader to be supplied with electricity without involving a power supply such as an AC adapter provided outside the image reader.

According to aspects of the disclosure, further provided is an image reader that includes a housing, a feed tray that includes a loading surface configured such that a document sheet to be fed into the housing along a feeding direction are placed thereon, a feeding mechanism configured to feed the document sheet placed on the loading surface of the feed tray along a feeding path, a reading unit disposed inside the housing, the reading unit being configured to read an image of the document sheet being fed along the feeding path, and a power supply unit disposed inside the housing, the power supply unit being configured to supply electricity to the reading unit.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an embodiment according to aspects of the disclosure will be described with reference to the accompanying drawings.

(Embodiment)

In the following description, the front side, the rear side, the left side, the right side, the upside, and the downside of an image reader 1 of the embodiment will be defined as shown in the accompanying drawings.

<Overall Configuration>

Figure 3:
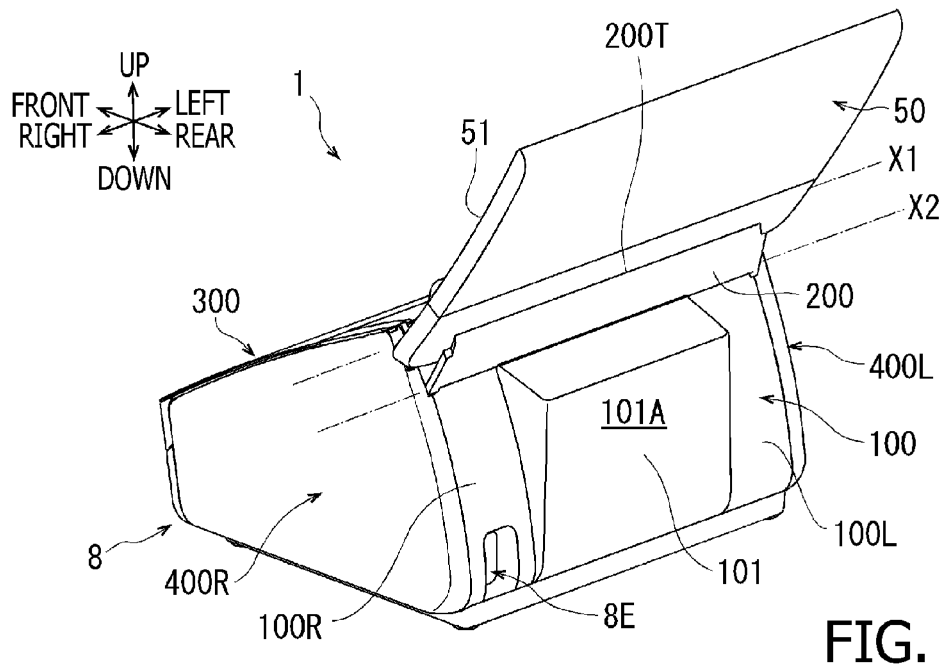
FIG. 3 is a perspective view mainly showing the rear side of the image reader in a state where the feed tray is in an open position in the embodiment according to one or more aspects of the disclosure.
Figure 4:
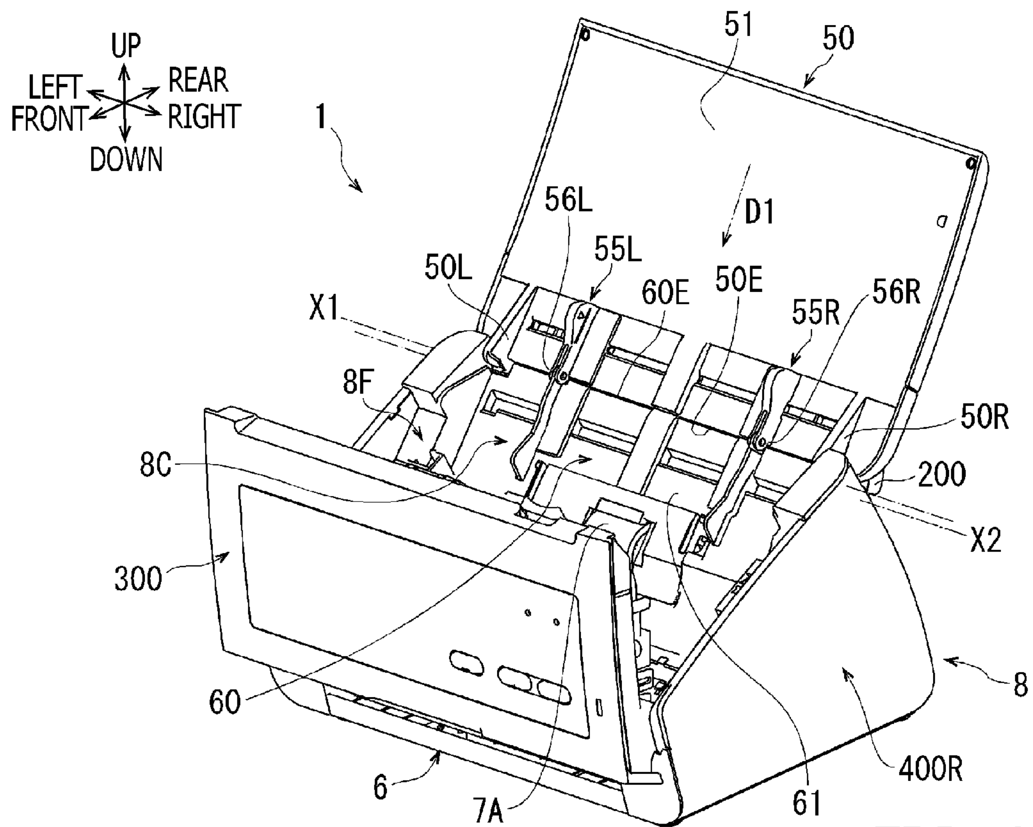
FIG. 4 is a perspective view mainly showing the front side of the image reader in the state where the feed tray is in the open position in the embodiment according to one or more aspects of the disclosure.
Figure 5:
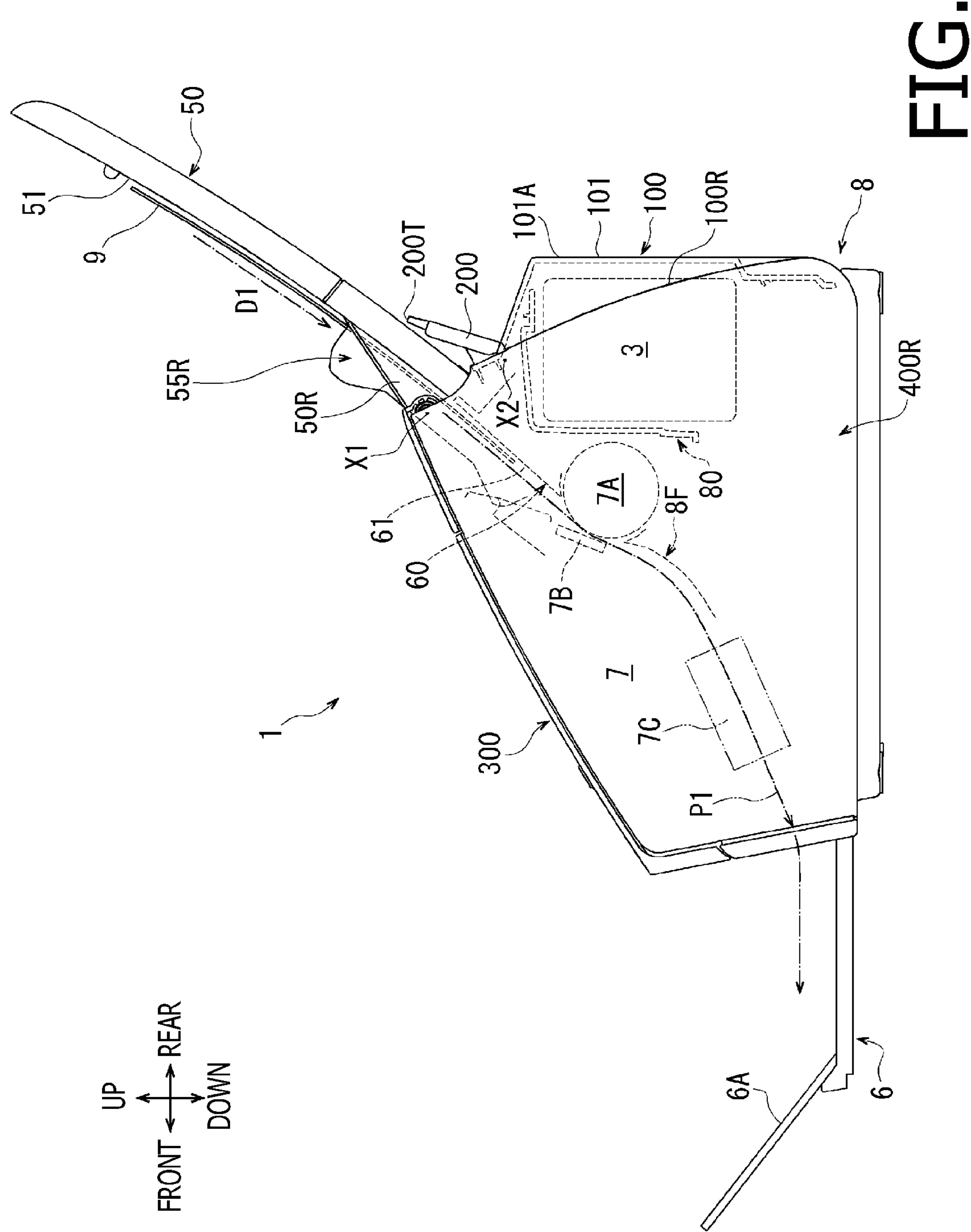
FIG. 5 is a side view of the image reader in the state where the feed tray is in the open position in the embodiment according to one or more aspects of the disclosure.
Figure 6:
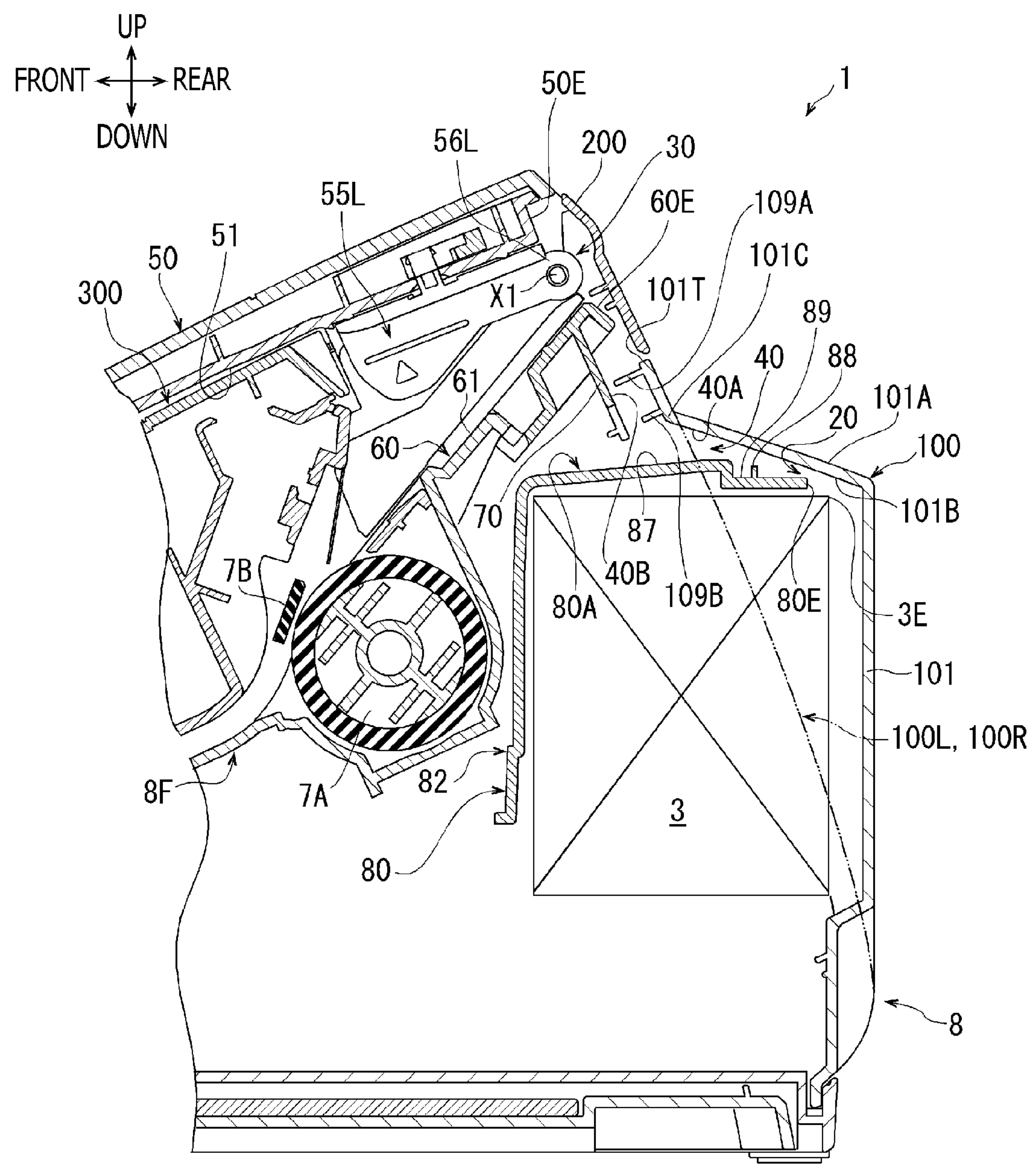
FIG. 6 is an enlarged cross-sectional side view showing a configuration of a region around a power supply unit of the image reader in the state where the feed tray is in the closed position in the embodiment according to one or more aspects of the disclosure.

As shown in FIGS. 1 to 5, the image reader 1 includes a housing 8, a feed tray 50, and a catch tray 6. In addition, as shown in FIGS. 5 and 6, the image reader 1 further includes a power supply unit 3 and a reading unit 7.

Figure 2:
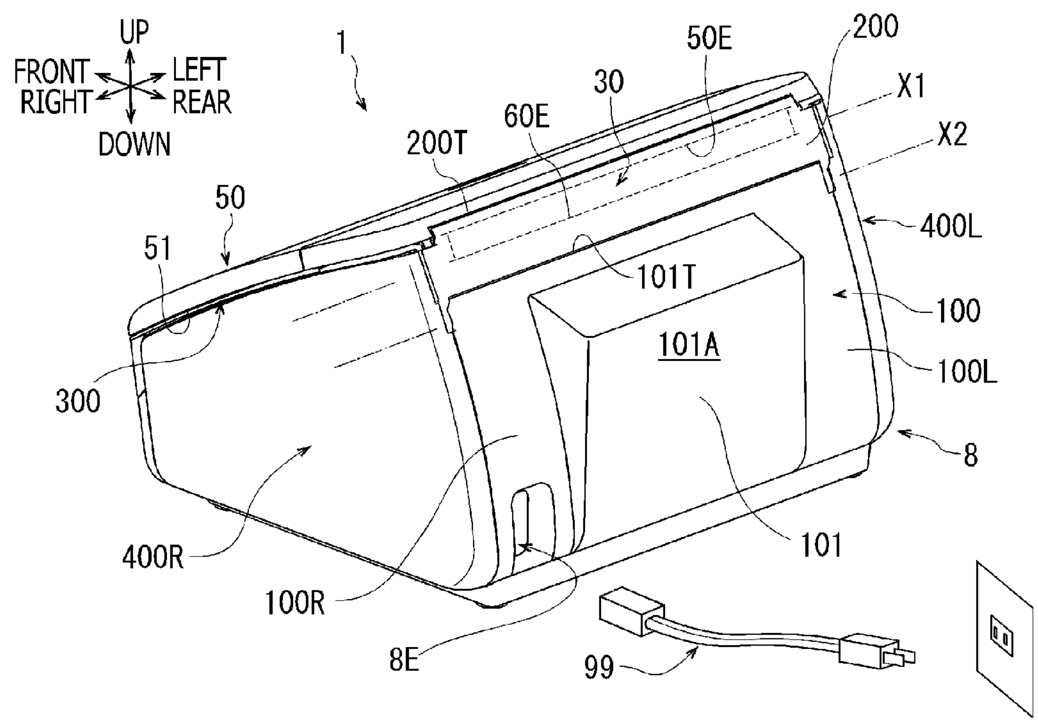
FIG. 2 is a perspective view mainly showing a rear side of the image reader in a state where a feed tray is in a closed position in the embodiment according to one or more aspects of the disclosure.

The housing 8, which is a box-shaped body, includes an upper cover 300, a rear cover 100, a left-side cover 400L, a right-side cover 400R (see FIGS. 1 to 3), and an inner frame 8F (see FIG. 4). As shown in FIGS. 1 to 3, and 5, the upper cover 300 is generally slanted up toward the rear side thereof. Meanwhile, as shown in FIG. 4, to fix a paper jam or do maintenance, the upper cover 300 is swung such that the rear end thereof is lifted up. Thereby, an upper wall 8C of the inner frame 8F of the housing 8 and a feed roller 7A are exposed to the outside.

The feed tray 50 is formed in a flat plate shape of which one surface serves as the loading surface 51. Further, the feed tray 50 includes two hinges 50L and 50R, which are formed at a left corner and a right corner of the feed tray 50, respectively, integrally with the feed tray 50. The feed tray 50 is supported by the housing 8 via the hinges 50L and 50R, to be swingable around a first swing axis X1 that is located at an upper rear side of the housing 8 and extends in the left-to-right direction.

As shown in FIGS. 1, 2, 6, and 7, the feed tray 50 is configured to, when closed, cover the housing 8 from above with the loading surface 51 directed downward. Hereinafter, the position of the feed tray 50 shown in FIGS. 1, 2, 6, and 7 will be referred to as a "closed position."

Figure 1:
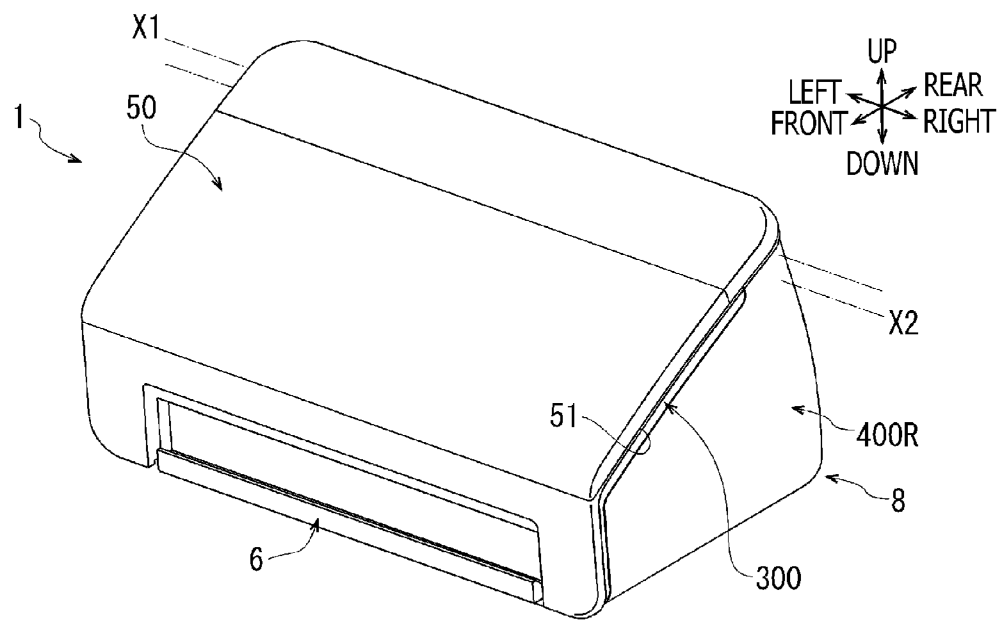
FIG. 1 is a perspective view mainly showing a front side of an image reader in an embodiment according to one or more aspects of the disclosure.

Further, when opened, the feed tray 50 is swung around the first swing axis X1 from the state as shown in FIG. 1. Through the swing motion, as shown in FIGS. 3 to 5, and 8, the feed tray 50 is moved to such a position that the loading surface 51 is directed upward at the rear side of the housing 8. Hereinafter, the position of the feed tray 50 shown in FIGS. 3 to 5 and 8 will be referred to as an "open position."

Figure 8:
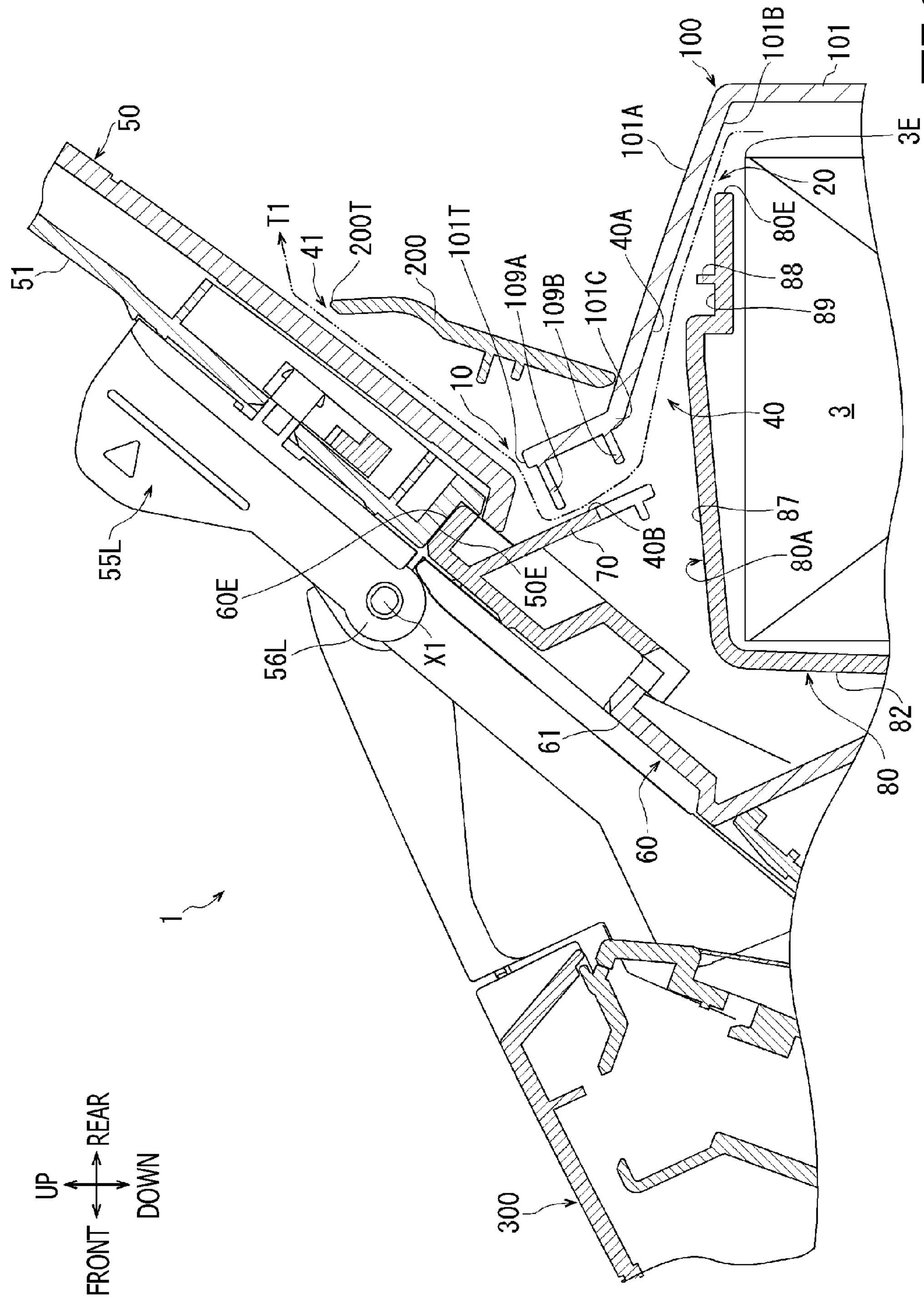
FIG. 8 is an enlarged cross-sectional side view showing a configuration of a region around the power supply unit of the image reader in the state where the feed tray is in the open position in the embodiment according to one or more aspects of the disclosure.

As shown in FIGS. 4, 5, and 8, the upper wall 8C of the inner frame 8F includes a guide surface 61, which is an upper surface of a flat plate portion 60 that extends in a manner slanted down to the feed roller 7A from the rear side of the housing 8. When the feed tray 50 is in the open position, the guide surface 61 and the loading surface 51 form a flat surface. At this time, as shown in FIG. 8, an end 60E of the flat plate portion 60 that is located on a side close to the first swing axis X1 is opposed in proximity to an end 50E of the feed tray 50 that is located on a side close to the first swing axis X1. As shown in FIG. 5, when a sheet 9 is placed on the loading surface 51, the leading end of the sheet 9 is pulled to the guide surface 61 to contact the feed roller 7A.

Figure 9:
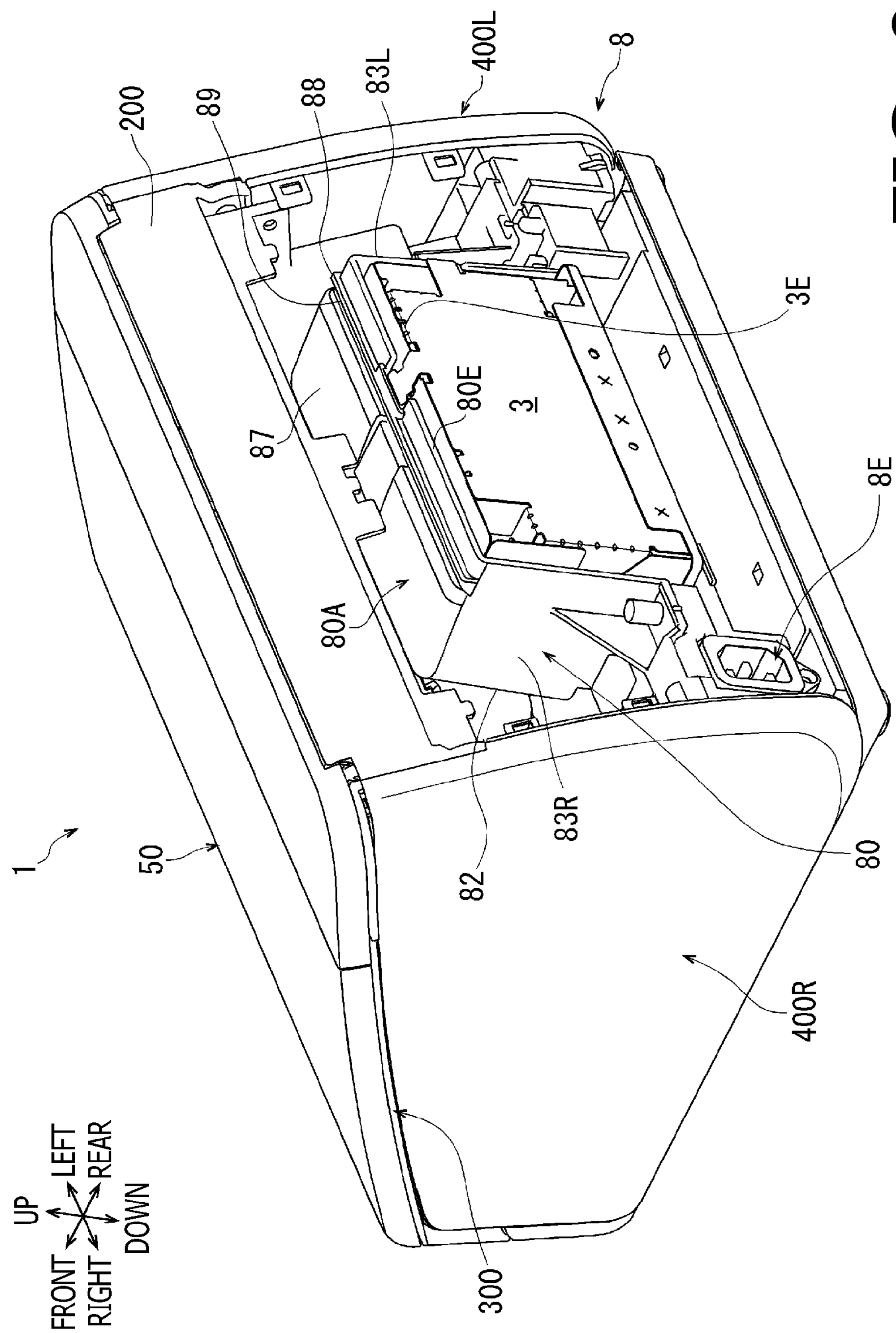
FIG. 9 is a perspective view showing the image reader in a state where a rear cover is removed therefrom in the embodiment according to one or more aspects of the disclosure.

As shown in FIGS. 5 and 6, the power supply unit 3 is disposed under the first swing axis X1 inside the housing 8. The power supply unit 3 is an AC adapter configured to convert an alternating-current (AC) voltage output from a household wall outlet into a direct-current (DC) voltage and supply the DC voltage to the reading unit 7. As shown in FIGS. 2 and 9, a rear face of the housing 8 includes a connection hole 8E. Into the connection hole 8E, fitted is an end of a power cable 99 for electrically connecting the power supply unit 3 with the household wall outlet.

The power supply unit 3 is covered from behind with the rear cover 100. Further, the power supply unit 3 is covered at least from above with a power supply cover 80, which is disposed under the inner frame 8F inside the housing 8.

As shown in FIG. 5, the reading unit 7 is attached to the inner frame 8F inside the housing 8. The reading unit 7 includes the feed roller 7A, a separation pad 7B, an image reading sensor 7C, and an ejection roller (not shown). The reading unit 7 is configured to feed the sheet 9 placed on the loading surface 51 forward along a feeding path P1 that extends in a manner slanted down forward. Further, the reading unit 7 is configured to read an image of the sheet 9 with the image reading sensor 7C in the middle of the feeding path P1. As the image reading sensor 7C, various types of sensors such as a contact image sensor (CIS) and a charge coupled device (CCD) may be employed. When including two image reading sensors facing each other across the feeding path P1, the reading unit 7 is allowed to perform double-side reading to read images of both sides of the sheet 9.

As shown in FIGS. 1 and 5, the catch tray 6 is configured to be drawn from and inserted into the housing 8. As shown in FIG. 1, when the catch tray 6 is housed inside the housing 8, a front end face of the catch tray 6 is exposed to the outside. When the catch tray 6 is drawn, the catch tray 6 is put into a state where a catch surface 6A is directed upward in front of the housing 8, as shown in FIG. 5.

When the sheet 9 of which the image has been read by the reading unit 7 is further conveyed along the feeding path P1, the sheet 9 is ejected onto the catch surface 6A. When a plurality of sheets 9 are placed on the loading surface 51, the sheets 9 are fed along the feeding path P1 on a sheet-by-sheet basis. Then, after images of the sheets 9 are read by the reading unit 7, the sheets 9 are sequentially ejected onto and stacked on the catch surface 6A.

Figure 7:
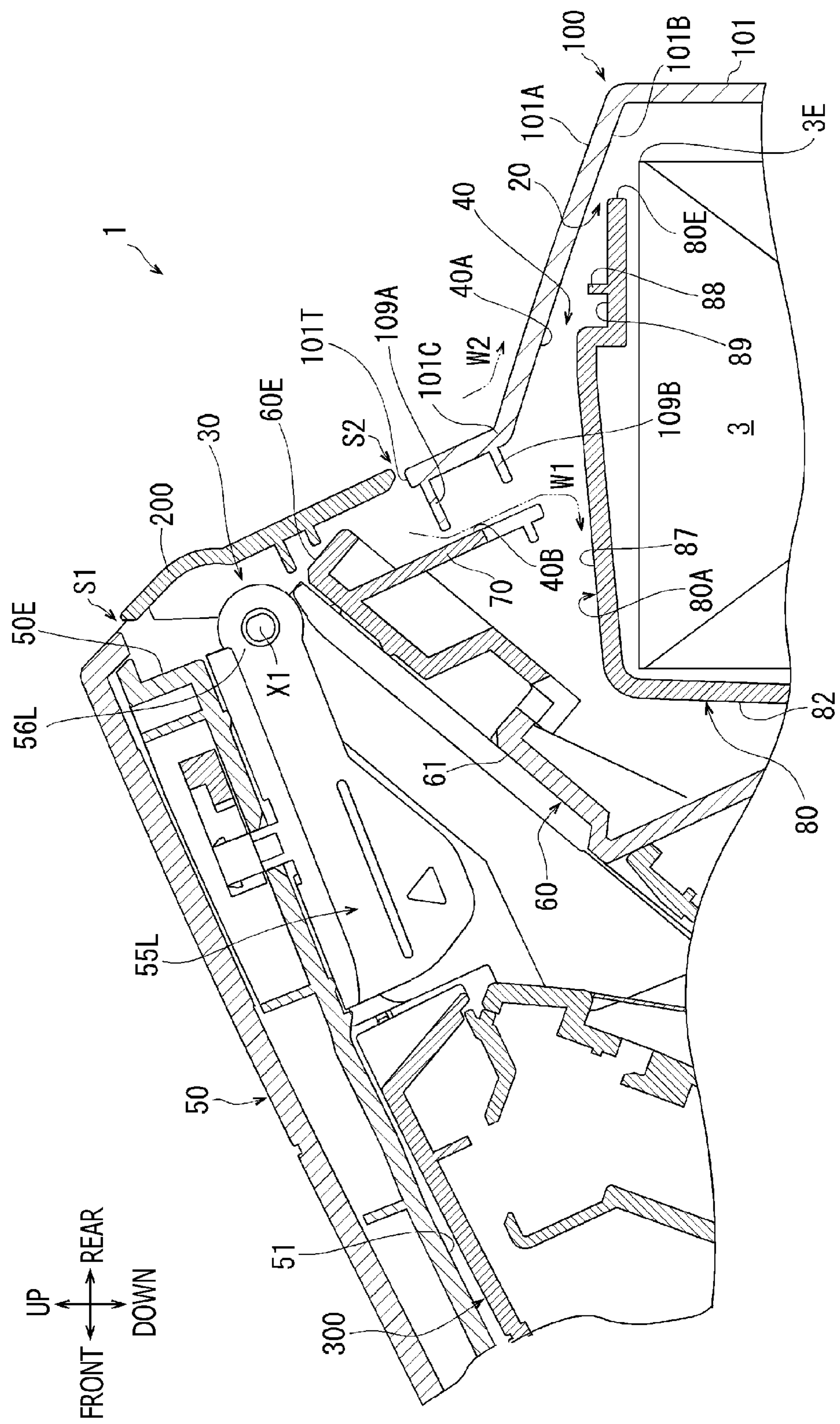
FIG. 7 is an enlarged cross-sectional side view showing (in a more enlarged manner than FIG. 6) a configuration of a region around the power supply unit of the image reader in the state where the feed tray is in the closed position in the embodiment according to one or more aspects of the disclosure.

As shown in FIGS. 2, 6, and 7, when the feed tray 50 is swung from the open position to the closed position, the end 60E of the flat plate portion 60 on the side close to the first swing axis X1 is separated in the vertical direction from the end 50E of the feed tray 50 on the side close to the first swing axis X1, so as to form a third opening 30.

Further, as shown in FIGS. 2 and 3, the image reader 1 is provided with an opening cover 200. The opening cover 200 is supported by the inner frame 8F of the housing 8 to be swingable around a second swing axis X2, which is parallel to the first swing axis X1 and disposed lower than the first swing axis X1.

As shown in FIGS. 2, 6, and 7, when the feed tray 50 is in the closed position, the opening cover 200 covers the third opening 30. The opening cover 200 is configured to swing around the second swing axis X2 in conjunction with the feed tray 50 being swung to the open position and then evacuate under the feed tray 50 as shown in FIGS. 3, 5, and 8.

In the embodiment, as shown in FIG. 4, a width direction of the sheet 9 fed along a feeding direction D1 is defined as the left-to-right direction. The first swing axis X1 and the second swing axis X2 are substantially parallel to the left-to-right direction that is the width direction of the sheet 9.

Further, as shown in FIG. 4, the image reader 1 includes two width regulating guides 55L and 55R. Each of the two width regulating guides 55L and 55R is formed in a rib shape to extend from a position on the loading surface 51 to a position on the guide surface 61 in parallel with the feeding direction D1. The width regulating guides 55L and 55R include joining sections 56L and 56R, respectively, in the middle thereof in the feeding direction D1. As shown in FIGS.

7 and 8, when the feed tray 50 is swung to the closed position or the open position, the joining sections 56L and 56R allow the width regulating guides 55L and 55R to be bent or straightened around the first swing axis X1.

The sheet 9 placed on the loading surface 51 is positioned in the width direction when the width regulating guides 55L and 55R are made close to or separated from each other in the width direction on the basis of the center therebetween in the width direction. Thereby, the image reader 1 is allowed to read an image formed on a sheet of any of various sizes, e.g., from the name card size to the A4 size.

<Configuration to Transfer Heat of Power Supply Unit to Outside of Housing>

In the image reader 1 of the embodiment, the power supply unit 3 is covered with the inner frame 8F, the rear cover 100, the left-side cover 400L, the right-side cover 400R, and the power supply cover 80. Therefore, the image reader 1 is allowed to transfer heat of the power supply unit 3 to the outside of the housing 8 when having the following configuration.

As shown in FIG. 9 showing the image reader 1 in a state where the rear cover 100 is removed therefrom, the power supply unit 3 includes a metal shield box and a low-voltage power supply circuit board incorporated in the metal shield box.

As shown in FIGS. 6 and 9, the power supply cover 80 is disposed under the inner frame 8F. The power supply cover 80 has an upper surface 80A that covers the power supply unit 3 from above, a front surface 82 that is located behind the feed roller 7A and covers the power supply unit 3 from the front, a left-side surface 83L that covers the power supply unit 3 from the left side, and a right-side surface 83R that covers the power supply unit 3 from the right side.

As shown in FIGS. 6 to 9, the upper surface 80A of the power supply cover 80 includes a projection 88 formed in a rib shape to protrude upward from the upper surface 80A in front of a rear end 80E of the upper surface 80A. Further, the upper surface 80A of the power supply cover 80 includes a recessed section 89 formed in a groove to be recessed downward in front of the projection 88. The projection 88 and the recessed section 89 extend over the entire length of the upper surface 80A in the width direction in parallel with the rear end 80E.

Further, the upper surface 80A of the power supply cover 80 includes a slanted surface 87 formed to be slanted down forward in front of the recessed section 89. A rear end of the slanted surface 87 is higher than the projection 88.

As shown in FIG. 2, the rear cover 100 includes curved portions 100L and 100R provided at the left side and the right side of the power supply unit 3, respectively. The curved portions 100L and 100R are formed to extend down rearward from near the end 60E of the flat plate portion 60 in a gently curved manner. The rear cover 100 includes a bulging portion 101 disposed between the curved portions 100L and 100R.

As shown in FIG. 6, when viewed along the width direction, the power supply unit 3 protrudes rearward and upward from the curved portions 100L and 100R. The bulging portion 101 also protrudes rearward and upward from the curved portions 100L and 100R so as to cover the power supply unit 3.

As shown in FIGS. 6 to 8, when the bulging portion 101 is viewed along the width direction, an outer surface 101A and an inner surface 101B of the bulging portion 101 further extend down rearward from a position separated rearward and downward from the end 60E of the flat plate portion 60. Moreover, the outer surface 101A and the inner surface 101B of the bulging portion 101 extend rearward to a position beyond an upper rear end 3E of the power supply unit 3 and thereafter are bent to extend vertically downward.

The outer surface 101A and the inner surface 101B of the bulging portion 101 are bent at an intermediate portion 101C of a downward-slanted section (slanted down rearward) in the front-to-rear direction such that the intermediate portion 101C protrudes toward the inside of the housing 8 (i.e., forward).

The inner surface 101B of the bulging portion 101 includes ribs 109A and 109B formed to extend in the width direction in a position higher than the intermediate portion 101C. The ribs 109A and 109B protrude in a manner slanted down forward from the inner surface 101B.

The inner frame 8F includes an inner wall portion 70 formed integrally therewith on a lower surface of the flat plate portion 60. The inner wall portion 70 extends downward from near the end 60E of the flat plate portion 60 and faces the inner surface 101B of the bulging portion 101. There is a gap formed between a lower end of the inner wall portion 70 and the upper surface 80A of the power supply cover 80 in the vertical direction. Further, there is a gap formed between the inner wall portion 70 and the ribs 109A and 109B in the front-to-rear direction.

As shown in FIG. 8, when the feed tray 50 is swung from the closed position to the open position, an upper end 101T of the bulging portion 101 is separated from the feed tray 50, so as to form a first opening 10. The first opening 10 is formed such that the inside of the housing communicates with the outside of the housing therethrough.

Further, as shown in FIG. 8, there is a second opening 20 formed between the rear end 80E of the upper surface 80A of the power supply cover 80 and the inner surface 101B of the bulging portion 101. The second opening 20 is disposed higher than the upper rear end 3E of the power supply unit 3 and lower than the first opening 10 inside the housing 8. When viewed along the width direction, the first opening 10 is located in a further inner position relative to the second opening 20 inside the housing 8, namely, in a position anterior to the second opening 20.

Between the bulging portion 101 and the inner wall portion 70, a communication path 40 is formed, through which the first opening 10 communicates with the second opening 20. More specifically, a downward-slanted section (slanted down rearward) of the inner surface 101B of the bulging portion 101 forms an outside surface 40A of the communication path 40. Further, a surface of the inner wall portion 70, which surface faces the outside surface 40A of the communication path 40, forms an inside surface 40B of the communication path 40.

As shown in FIG. 8, when the feed tray 50 is swung from the closed position to the open position, an upper end 200T of the opening cover 200 is separated from the feed tray 50, so as to form a fourth opening 41. The fourth opening 41 is a gap between at least a part of the upper end 200T in the width direction and at least a part of the feed tray 50 in the width direction that are separated from one another. Namely, the upper end 200T and the feed tray 50 do not necessarily have to be separated from each other over the entire lengths thereof in the width direction. The upper end 200T and the feed tray 50 have only to be partially separated from each other in at least a position in the width direction. For example, the fourth opening 41 may be formed when the center of the upper end 200T in the width direction contacts the feed tray 50 and a side of the upper end 200T in the width direction is separated from the feed tray 50. Further, for example, the fourth opening 41 may be formed when at least a part of the upper end 200T in the width direction is separated from the feed tray 50 owing to dimensional tolerances of components and/or deformation of the opening cover 200. FIG. 8 exemplifies the fourth opening 41 formed in a position in the width direction where the upper end 200T is separated from the feed tray 50. It is noted that the first opening 10 may be formed in the same manner. For example, the first opening 10 has only to be formed when the upper end 101T is partially separated from the feed tray 50 at least in a position in the width direction. The fourth opening 41 is formed, in a position behind and higher than the first opening 10, to communicate with the first opening 10.

<Operations and Effects>

As shown in FIG. 8, the image reader 1 of the embodiment is allowed to transfer heat from the power supply unit 3 to the outside of the housing 8 via the second opening 20, the communication path 40, and the first opening 10. Especially, according to the image reader 1, it is possible to certainly transfer exhaust heat, passing through the first opening 10, from the power supply unit 3 to the outside of the housing 8 via the fourth opening 41 formed between the opening cover 200 and the feed tray 50 in use of the image reader 1. It is noted that a heat transfer path from the power supply unit 3 to the outside of the housing 8 is indicated by a chain double-dashed line T1. Thus, the inside of the housing 8 is hard to raise to a high temperature since the exhaust heat from the power supply unit 3 is not kept inside the housing 8.

Hence, according to the image reader 1 of the embodiment, it is possible to prevent an operational failure of the reading unit 7 caused by the exhaust heat from the power supply unit 3.

Further, according to the image reader 1, when it is not used, the opening cover 200 covers the third opening 30 as shown in FIG. 2. Therefore, it is possible to prevent foreign substance such as dust from getting into the housing 8.

Further, according to the image reader 1, the bulging portion 101 of the rear cover 100 serves as both a cover for the power supply unit 3 and the outside surface 40A of the communication path 40. Therefore, it is possible to simplify the configuration of the image reader 1.

Referring to FIG. 7, suppose that water might get into the housing 8 via gaps S1 and S2 between the feed tray 50 in the closed position and the opening cover 200 covering the third opening 30. However, even in such a case, according to the image reader 1, since the entry pathway for water from the gaps S1 and S2 is located in a further inner position relative to the second opening 20 inside the housing 8, namely, in a position anterior to the second opening 20, the water is likely to drip in a position away from the second opening 20. Accordingly, the water hardly reaches the power supply unit 3. It is noted that the entry pathway through which water might get into the housing 8 via the gaps S1 and S2 is indicated by an arrow W1. Thus, it is possible to prevent occurrence of electrical short of the power supply unit 3.

Further, according to the image reader 1, as shown in FIG. 7, the outer surface 101A of the bulging portion 101 is slanted down from the first opening 10 toward the second opening 20. Therefore, even though water is squirted on the outer surface 101A of the bulging portion 101, the water drops downward as shown in FIG. 7. Thus, the water is hard to keep on the outer surface 101A. It is noted that the water squirted on the outer surface 101A is indicated by an arrow W2.

Further, according to the image reader 1, the inner surface 101B of the bulging portion 101 is slanted down from the first opening 10 to the second opening 20. Further, the bulging portion 101 is bent at the intermediate portion 101C such that the intermediate portion 101C protrudes toward the inside of the housing 8. Therefore, even though water gets into the housing 8 via the first opening 10, the water is likely to drop onto a position further away from the second opening 20. Thus, the water hardly reaches the power supply unit 3.

Further, according to the image reader 1, the bulging portion 101 includes the ribs 109A and 109B extending from the inner surface 101B toward the inside of the housing 8. Therefore, even though water gets into the housing 8 via the first opening 10, the water is likely to drop onto a position further away from the inner surface 101B of the bulging portion 101 and the second opening 20. Thus, the water hardly reaches the power supply unit 3.

Further, according to the image reader 1, the inner wall portion 70 faces the bulging portion 101 above the power supply unit 3, and includes the inside surface 40B of the communication path 40. Therefore, it is possible to easily form the communication path 40 through which the first opening 10 communicates with the second opening 2.

Further, according to the image reader 1, even though water gets into the housing 8 and drops onto the power supply cover 80, the water drops onto a position away from the second opening 20 that is a gap formed between the end 80E of the power supply cover 80 and the inner surface 101B of the bulging portion 101. Thus, the water hardly reaches the power supply unit 3.

Further, according to the image reader 1, the upper surface 80A of the power supply cover 80 is slanted down forward, i.e., toward a side thereof opposite to a side at which the second opening 20 is formed. Therefore, even though water gets into the housing 8 via the first opening 10, the water moves farther away from the second opening 20. Thus, the water hardly reaches the power supply unit 3.

Further, according to the image reader 1, the upper surface 80A of the power supply cover 80 includes the projection 88 and the recessed section 89 disposed in further inner positions relative to the second opening 20 inside the housing 8, namely, in positions anterior to the second opening 20. Therefore, even though water drops onto the upper surface 80A of the power supply cover 80, the water is blocked by the projection 88 and the recessed section 89 before reaching the second opening 20. Thus, the water hardly reaches the power supply unit 3.

Further, according to the embodiment, the image reader 1 includes the power supply unit 3 inside the housing 8. Thereby, it is possible to avoid an undesired situation that an external power supply unit provided out of the image reader 1 lies in a user's way.

Further, according to the image reader 1 of the embodiment, the power supply unit 3 is opposed to the reading unit 7 across the feed roller 7A. Thereby, it is possible to prevent an undesired situation that heat from the power supply unit 3 has a negative influence on a reading operation of the reading unit 7.

Further, according to the image reader 1 of the embodiment, the separation pad 7B is allowed to separate one document sheet from one or more other document sheets so as to feed a plurality of document sheets on a sheet-by-sheet basis along the feeding path P1, more efficiently owing to the heat from the power supply unit 3.

Further, according to the image reader 1 of the embodiment, the power supply unit 3 is disposed under the feed tray 50. Therefore, it is possible to render lower the height of the image reader 1, for instance, than when the power supply unit 3 is disposed under the reading unit 7.

Further, according to the image reader 1 of the embodiment, the connection hole 8E is disposed behind the power supply unit 3. Therefore, the connection hole 8E is hard to notice when the image reader 1 is viewed from the front side.

Moreover, the connection hole 8E is disposed at the right side of the image reader 1. Thus, it is possible to more efficiently use a space that is not related to sheet feeding or image reading and downsize the image reader 1, for instance, in comparison with when the connection hole 8E is disposed above the power supply unit 3.

Hereinabove, the embodiment according to aspects of the disclosure has been described. The disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the disclosure. However, it should be recognized that the disclosure can be practiced without reapportioning to the details specifically set forth. In other instances, well known processing structures have not been described in detail, in order not to unnecessarily obscure the disclosure.

Only an exemplary embodiment of the disclosure and but a few examples of their versatility are shown and described in the disclosure. It is to be understood that the disclosure is capable of use in various other combinations and environments and is capable of changes or modifications within the scope of the inventive concept as expressed herein. For example, the following modifications are possible.

(Modifications)

In the aforementioned embodiment, the opening cover 200 is swingably supported by the housing 8. However, for instance, the opening cover 200 may be swingably supported by the feed tray 50. In this case, the first opening 10 may be formed between the opening cover 200 that does not cover the third opening 30 when the feed tray 50 is swung to the open position and an exterior cover (e.g., the rear cover 100) that covers the power supply unit 3 laterally (i.e., from a side of the power supply unit 3).

In the aforementioned embodiment, the outer surface 101A of the bulging portion 101 is slanted down from the first opening 10 toward the second opening 20. However, for instance, the outer surface 101A of the bulging portion 101 may extend horizontally or to be slanted up from the first opening 10 toward the second opening 20.

In the aforementioned embodiment, the bulging portion 101 is bent at the intermediate portion 101C such that the intermediate portion 101C protrudes toward the inside of the housing 8. However, for instance, the bulging portion 101 may be configured to extend straight from the first opening 10 to the second opening 20.

In the aforementioned embodiment, the ribs 109A and 109B protrude to be slanted down from the inner surface 101B of the bulging portion 101 toward the inside of the housing 8. However, for instance, one or more ribs similar to the ribs 109A and 109B may protrude to be slanted up toward the inside of the housing 8.

In the aforementioned embodiment, the projection 88 and the recessed section 89 are formed on the upper surface 80A of the power supply cover 80. However, for instance, only a downward-recessed section may be provided on the upper surface 80A of the power supply cover 80. Alternatively, only an upward-protruding projection may be provided on the upper surface 80A of the power supply cover 80.

What is claimed is:

1. An image reader comprising:

a housing;

a feed tray comprising a loading surface configured to receive placement of a document sheet to be fed into the housing along a feeding direction, the feed tray being formed in a flat plate shape and configured to be swingable around a first swing axis parallel to a width direction of the document sheet between a first position where the loading surface is directed toward the housing and a second position where the loading surface is disposed upstream of the housing in the feeding direction;

a reading unit disposed inside the housing, the reading unit being configured to feed the document sheet placed on the loading surface into the housing and read an image of the document sheet;

a power supply unit disposed under the first swing axis inside the housing, the power supply unit being configured to supply electricity to the reading unit;

a first opening formed between the housing and the feed tray placed in the second position, the first opening being configured such that an inside of the housing communicates with an outside of the housing therethrough; and a second opening formed within the housing in a position higher than the power supply unit and lower than the first opening inside the housing, wherein a communication path is defined between the first opening and the second opening.

2. The image reader according to claim 1, further comprising:

a third opening formed within the housing between an end of the housing located on a side close to the first swing axis and an end of the feed tray located on a side close to the first swing axis when the feed tray is swung from the second position to the first position and when the end of the housing is separated from the end of the feed tray;

an opening cover swingable around a second swing axis parallel to the first swing axis, the opening cover being configured to cover the third opening; and a fourth opening formed between the opening cover and the feed tray placed in the second position, the fourth opening being configured to communicate with the first opening.

3. The image reader according to claim 1, wherein the housing comprises an exterior cover that comprises an outside surface of the communication path, and wherein the exterior cover is configured to cover the power supply unit laterally from a side of the power supply unit.

4. The image reader according to claim 3, wherein the first opening is located closer to a central portion of the housing than the second opening.

5. The image reader according to claim 4, wherein the exterior cover comprises an outer surface slanted from the first opening toward the second opening.

6. The image reader according to claim 4, wherein the exterior cover comprises:

an inner surface slanted from the first opening toward the second opening; and an intermediate portion at which the exterior cover is bent such that the intermediate portion protrudes toward the inside of the housing.

7. The image reader according to claim 4, wherein the exterior cover comprises a rib formed to protrude toward the inside of the housing.

8. The image reader according to claim 3, wherein the housing comprises an inner wall portion configured to face the exterior cover above the power supply unit, and wherein the inner wall portion comprises an inside surface of the communication path.

9. The image reader according to claim 3, further comprising a power supply cover disposed inside the housing, the power supply cover being configured to cover the power supply unit at least from above, wherein the second opening is a gap formed between the power supply cover and the exterior cover.

10. The image reader according to claim 9, wherein the power supply cover comprises an upper surface slanted down toward a side thereof opposite to a side at which the second opening is formed.

11. The image reader according to claim 9, wherein the power supply cover comprises at least one of a projection and a recessed section, provided on an upper surface thereof, and wherein the at least one of the projection and the recessed section is disposed in a further inner position relative to the second opening inside the housing.

* * * * *